(12) United States Patent
Liang et al.

(10) Patent No.: US 10,621,906 B2
(45) Date of Patent: Apr. 14, 2020

(54) DISPLAY PANEL, DISPLAY DEVICE AND DISPLAY METHOD

(71) Applicant: BOE TECHNOLOGY GROUP CO., LTD., Beijing (CN)

(72) Inventors: Pengxia Liang, Beijing (CN); Wei Wang, Beijing (CN); Xiaochuan Chen, Beijing (CN); Jifeng Tan, Beijing (CN); Xiandong Meng, Beijing (CN); Jian Gao, Beijing (CN); Xianqin Meng, Beijing (CN); Jing Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 11 days.

(21) Appl. No.: 16/145,357

(22) Filed: Sep. 28, 2018

(65) Prior Publication Data

US 2019/0237005 A1 Aug. 1, 2019

(30) Foreign Application Priority Data

Jan. 31, 2018 (CN) .......................... 2018 1 0100372

(51) Int. Cl.
*G09G 3/30* (2006.01)
*G09G 3/20* (2006.01)
*H04N 9/31* (2006.01)

(52) U.S. Cl.
CPC ............. *G09G 3/30* (2013.01); *G09G 3/2003* (2013.01); *H04N 9/312* (2013.01); *G09G 2310/0264* (2013.01)

(58) Field of Classification Search
CPC ................... G09G 3/2003; G09G 3/30; G09G 2310/0264; H04N 9/312
See application file for complete search history.

(56) References Cited

U.S. PATENT DOCUMENTS

| | | | |
|---|---|---|---|
| 2010/0053043 A1* | 3/2010 | Sakamoto | H01L 27/3213 345/77 |
| 2017/0278446 A1* | 9/2017 | Ishiyama | G02F 1/134309 |
| 2018/0197444 A1* | 7/2018 | Mao | G09F 9/3026 |

* cited by examiner

*Primary Examiner* — Vinh T Lam
(74) *Attorney, Agent, or Firm* — Calfee, Halter & Griswold LLP

(57) ABSTRACT

The present disclosure provides a display panel, a display device and a display method. The display panel includes a substrate and several pixel units formed on the substrate. The pixel unit includes a monochromatic electroluminescent component, which is disposed on the substrate; a rotating mechanism, which includes a bracket and a diaphragm set disposed on the bracket, the diaphragm set comprising diaphragms with at least two different colors; and a microelectromechanical controller, which is connected to the bracket to control rotation of the bracket, so as to control an orthographic projection of the diaphragm on the substrate to at least partially overlap with an orthographic projection of the monochromatic electroluminescent component on the substrate, such that a light emitted by the monochromatic electroluminescent component permeates through the diaphragms of different colors, and emits a light corresponding to the colors of the diaphragms.

20 Claims, 3 Drawing Sheets

DISPLAY PANEL, DISPLAY DEVICE AND DISPLAY METHOD

CROSS REFERENCE

This application is based upon and claims priority to Chinese Patent Application No. 201810100372.X, filed on Jan. 31, 2018, the entire contents thereof are incorporated herein by reference.

TECHNICAL FIELD

The present disclosure generally relates to a field of an electronic display device, and in particular, to a display panel, a display device, and a display method.

BACKGROUND

A micro-LED display device has attracted wide attention due to its high resolution, portability, low power consumption and high brightness and so on.

At present, the common micro-LED color display structure is a RGB array that may directly realize a display function, that is, three LEDs with the RGB serve as one pixel to realize color display. The aforesaid solution of realizing color display has obvious disadvantages of a large amount of the micro-LEDs need to be transferred and higher request for a transferring yield.

SUMMARY

According to one aspect of the present disclosure, an embodiment of the present disclosure provides a display panel, including
a substrate;
several pixel units formed on the substrate;
wherein each of the pixel units includes:
a monochromatic electroluminescent component, which is disposed on the substrate;
a rotating mechanism, which includes a bracket and a diaphragm set disposed on the bracket, the diaphragm set comprising diaphragms with at least two different colors;
a micro-electromechanical controller, which is connected to the bracket to control rotation of the bracket, so as to control an orthographic projection of the diaphragm on the substrate to at least partially overlap with an orthographic projection of the monochromatic electroluminescent component on the substrate, such that a light emitted by the monochromatic electroluminescent component permeates through the diaphragms with different colors, and emits a light corresponding to the colors of the diaphragms.

According to one implementation of the present disclosure, the bracket is arranged perpendicular to the substrate.

According to one implementation of the present disclosure, the diaphragms with at least two different colors are uniformly disposed around the bracket that is taken as a center.

According to one implementation of the present disclosure, the diaphragms with at least two different colors are disposed on the same plane, the plane is parallel to the substrate, such that the bracket rotates to drive the diaphragm set to be movable within the plane parallel to the substrate.

According to one implementation of the present disclosure, an orthographic projection of the diaphragm on the substrate can cover an orthographic projection of the monochromatic electroluminescent component on the substrate.

According to one implementation of the present disclosure, the monochromatic electroluminescent component is a blue miniature electroluminescent component.

According to one implementation of the present disclosure, the diaphragm set includes a red diaphragm, a green diaphragm, and a transparent diaphragm.

According to one implementation of the present disclosure, the diaphragm is circular, square, diamond, triangular, or fan-shaped.

According to one implementation of the present disclosure, the diaphragm is a fluorescent film.

According to one implementation of the present disclosure, the diaphragm is a quantum dot film.

According to one implementation of the present disclosure, the display panel further includes a cover plate, and edges of the cover plate and the substrate are sealed by a packaging glue.

According to one implementation of the present disclosure, the display panel further includes a packaging layer disposed on the substrate, for packaging the monochromatic electroluminescent components.

According to one implementation of the present disclosure, a plurality of intermediate pillars spaced apart from one another are disposed between the cover plate and the substrate.

According to one implementation of the present disclosure, the micro-electromechanical controller includes a miniature motor.

According to one implementation of the present disclosure, the plane where the diaphragms are located has an angle in a range of 0° to 30° with the plane where the substrate is located.

According to one aspect of the present disclosure, an embodiment of the present disclosure further provides a display device, including a display panel and a drive circuit;
the display panel includes:
a substrate;
several pixel units formed on the substrate;
wherein each of the pixel units includes:
a monochromatic electroluminescent component, which is disposed on the substrate;
a rotating mechanism, which includes a bracket and a diaphragm set disposed on the bracket, the diaphragm set includes diaphragms with at least two different colors;
a micro-electromechanical controller, which is connected to the bracket, to control rotation of the bracket, so as to control an orthographic projection of one diaphragm on the substrate to at least partially overlap with an orthographic projection of the monochromatic electroluminescent component on the substrate, such that a light emitted by the monochromatic electroluminescent component permeates through the diaphragms of different colors, and emits a light corresponding to the colors of the diaphragms;
the drive circuit is electrically connected to the display panel, for driving the monochromatic electroluminescent components to emit light.

According to one aspect of the present disclosure, an embodiment of the present disclosure further provides a display method used in a display panel, wherein the display panel includes:
a substrate;
several pixel units formed on the substrate;
wherein each of the pixel units includes:
a monochromatic electroluminescent component, which is disposed on the substrate;

a rotating mechanism, which includes a bracket and a diaphragm set disposed on the bracket, the diaphragm set includes diaphragms with at least two different colors;

a micro-electromechanical controller, which is connected to the bracket, to control rotation of the bracket, so as to control an orthographic projection of one diaphragm on the substrate to at least partially overlap with an orthographic projection of the monochromatic electroluminescent component on the substrate, such that a light emitted by the monochromatic electroluminescent component permeates through the diaphragms of different colors, and emits a light corresponding to the colors of the diaphragms;

the display method includes:

driving a monochromatic electroluminescent component to emit light;

the micro-electromechanical controller controls rotation of the rotating mechanism, to control a time when each of the diaphragms exactly faces to the monochromatic electroluminescent component, so as to control the pixel unit to emit light of a desired color.

BRIEF DESCRIPTION OF THE DRAWINGS

The other features, objects and advantages of this disclosure will become more apparent from the following detailed description of non-limiting embodiments when taken in conjunction with the accompanying drawings.

DETAILED DESCRIPTION

Figure 1:
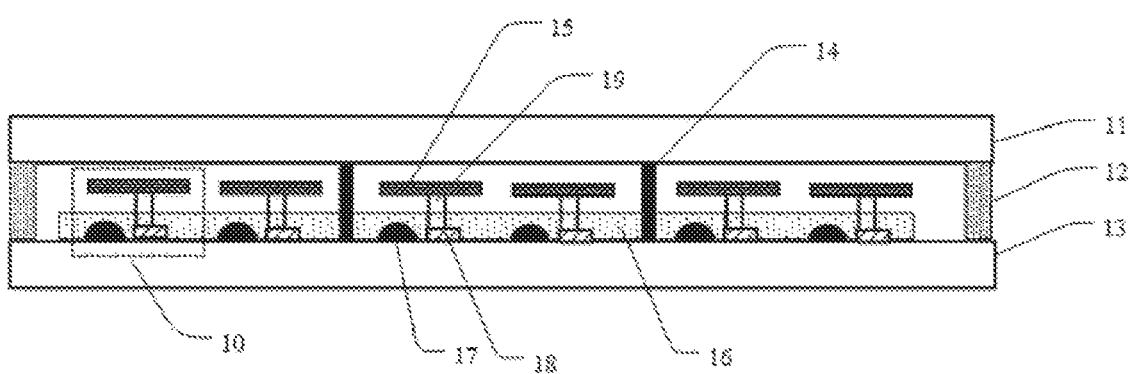
FIG. 1 shows an illustrative structural block diagram of a display panel according to an embodiment of the present disclosure.

Hereinafter, the present disclosure is further interpreted in combination with the drawings and the embodiments. It should be appreciated that the specific embodiments as described herein are merely employed to explain the relevant disclosure, rather to limit the disclosure. In addition, it should also be noted that only the portions relating to the present disclosure are shown in the drawings in order to description.

It should be noted that the embodiments and features in the embodiments of the present disclosure may be combined with each other without any conflict. The present disclosure will be described in detail below with reference to the drawings and in combination with the embodiments.

Referring to FIG. 1, an illustrative structural block diagram of a display panel according to an embodiment of the present disclosure is shown. As shown in FIG. 1, the display panel includes a substrate 13 and several pixel units 10 formed on the substrate and are arranged in an array. The pixel unit 10 includes:

a monochromatic electroluminescent component 17, which is disposed on the substrate 13;

a rotating mechanism, which includes a bracket 19 and a diaphragm set disposed on the bracket 19, the diaphragm set 15 includes diaphragms with at least two different colors;

a micro-electromechanical controller 18, which is connected to the bracket 19, to control rotation of the bracket 19, so as to control an orthographic projection of one diaphragm on the substrate 13 at least partially to be overlapped with an orthographic projection of the monochromatic electroluminescent component 17 on the substrate 13, such that light emitted by the monochromatic electroluminescent component 17 permeates through the diaphragms of different colors, and emits light corresponding to the colors of the diaphragms.

In one embodiment, the bracket 19 is configured to be perpendicular to the substrate 13.

The present disclosure provides a display panel having a monochromatic electroluminescent component 17, a diaphragm set 15, a rotating mechanism, and a micro-electromechanical controller 18 together as one pixel unit. The micro-electromechanical controller 18 controls the rotation of the bracket 19 to control the rotation of the diaphragm, such that the diaphragm exactly faces to the electroluminescent component 17. When the diaphragm exactly faces to the electroluminescent component, the orthographic projection of the diaphragm on the substrate 13 at least partially overlaps with the orthographic projection of the electroluminescent component 17 on the substrate 13, such that the light of the electroluminescent component 17 permeates through the diaphragms of different colors, and then emits the light having a color corresponding to the color of the diaphragm. The bracket 19 may be rotated in a clockwise direction or in a counterclockwise direction. Herein, the size of the diaphragm may be set according to different requirements for color purity, that is, the orthographic projection of the diaphragm on the substrate partially or completely overlaps with the orthographic projection of the electroluminescent component on the substrate, particularly referring to FIG. 2.

In practical use, the color of the monochromatic electroluminescent component 17, and the number and the color of the diaphragms may be set according to requirements. It can be seen that the monochromatic electroluminescent component and the rotatable diaphragm set are introduced as the pixel unit of the display panel, which may solve such problem that a large amount of the electroluminescent units may need to be transferred in the micro-LED display panel in the related art. Moreover, the aforesaid pixel unit may realize color display by using the monochromatic electroluminescence component. As compared with the traditional display panel in which one pixel unit uses three electroluminescent components, the display panel according to the present disclosure may greatly reduce the number of the electroluminescent components and improve the transferring yield.

The micro-electromechanical controller 18 is a MEMS (Micro-electromechanical systems) controller. Both the rotating mechanism and the diaphragm set 15 may use the MEMS means. The miniature electroluminescent component may use a miniature electroluminescent component micro LED.

Figure 2:
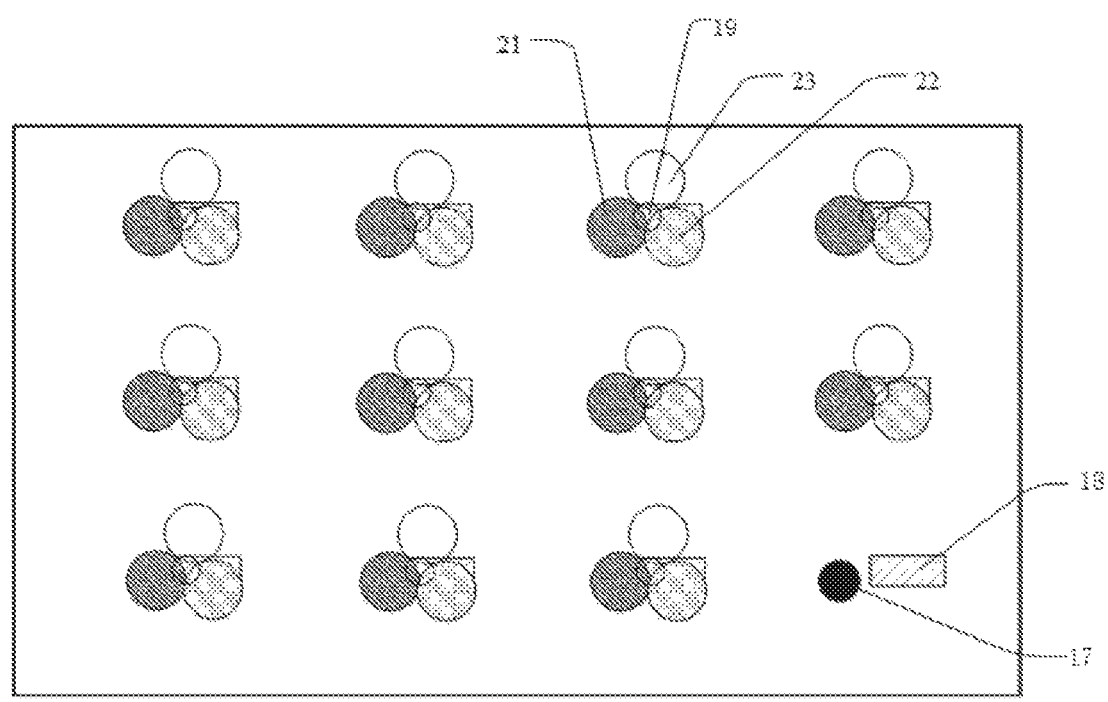
FIG. 2 shows an illustrative top view of the display panel according to an embodiment of the present disclosure.

Further referring to FIG. 2, an illustrative top view of the display panel according to the embodiment of the present disclosure is shown. As shown in FIG. 2, the respective diaphragms are uniformly disposed around the bracket that is taken as a center. The respective diaphragms are disposed on the same plane. The plane is parallel to a plane where the substrate is located, so that the bracket 19 rotates to drive the diaphragm set to be movable within the plane parallel to the substrate 13. The diaphragm set includes three diaphragms, such as a diaphragm 21, a diaphragm 22, and a diaphragm 23 located on the same plane and arranged around the bracket 19 as a center, and the respective diaphragms have the same sizes to cover the monochromatic electroluminescent component 17. As shown in FIG. 2, the bracket 19 has a rod-like structure, after the diaphragm 21, the diaphragm 22 and the diaphragm 23 are attached, they are adhered to the opposite end faces of the bracket 19 connected to the micro-electromechanical controller by an adhesive. Alternatively, several snap blind holes may be provided at a position of the opposite end face of the bracket 19 closing and connecting to the micro-electromechanical controller, such that the respective diaphragms are connected to the bracket in a snap manner.

It should be noted that the plane where the respective diaphragms are located may have a certain angle with the plane where the substrate is located. The angle may be any angle between 0° and 30°, and inclined directions of the respective diaphragms may be the same or different, and may be determined according to requirements. The bracket rotates to drive the diaphragm set to be movable within the plane parallel to the substrate, it means that after the diaphragm is rotated, the plane where a rotational track of any point on the diaphragm is located is parallel to the plane where the substrate is located.

According to one embodiment of the present disclosure, the orthographic projection of a diaphragm on the substrate may cover the orthographic projection of the monochromatic electroluminescent component on the substrate. In order to ensure singularity of the color of the light emitted by the monochromatic electroluminescent component through the diaphragm, an area of the diaphragm is allowed to cover the whole monochromatic electroluminescent component. And, the size of the diaphragm may be determined according to the requirements of the pixel unit and factors, such as a distance between the diaphragm and the monochromatic electroluminescent component. In one embodiment, the monochromatic electroluminescent component 17 is a blue miniature electroluminescent component. In a process of manufacturing the electroluminescent display panel, a micro-transferring method may be used to transfer the required miniature devices onto the substrate 13.

According to one embodiment of the present disclosure, the diaphragm set includes a red diaphragm 21, a green diaphragm 22, and a transparent diaphragm 23. In order to obtain the three-primary colors, red, green and transparent diaphragms may be used when the monochromatic electroluminescent component 17 uses a blue miniature electroluminescent component. The micro-electromechanical controller 18 switches the diaphragm facing the electroluminescent component 17 by means of the bracket 19. The light emitted through a diaphragm is red when the red diaphragm 21 exactly faces the electroluminescent component 17; the light emitted through the diaphragm is green when the green diaphragm 22 exactly faces the electroluminescent component 17; the light emitted through the diaphragm is blue when the transparent diaphragm 23 exactly faces the electroluminescent component 17. It should be noted that the respective diaphragms and the bracket 19 are removed from the pixel unit in the lower right of FIG. 2, in order to facilitate for showing the electroluminescent component 17 and the micro-electromechanical controller 18. At this time, the red diaphragm 21 exactly faces the electroluminescent component 17, that is, the orthographic projection of a central point of the red diaphragm 21 on the substrate overlaps with the orthographic projection of the center point of the electroluminescent component 17 on the substrate.

It can be understood that FIG. 2 only shows the display panel including the pixel units arranged in an array of 3 rows and 4 columns. In use, the number of rows and the number of columns of the array may be increased according to requirements.

In some embodiments, the diaphragm is circular, square, diamond, triangular, or fan-shaped. It may be understood that the shape of the diaphragm is not limited to those as above mentioned, and also may be others.

In one embodiment, the diaphragm is a fluorescent film. The use of the fluorescent film may reduce influence caused by the color of the electroluminescent component itself, so that the pixel unit displays the light with the color owned by the fluorescent film.

In one embodiment, the diaphragm is a quantum dot film. The quantum dot is a photo-excited nanocrystal material. The different nanocrystal materials may be excited to emit light of different colors.

Returning to FIG. 1, the display panel further includes a cover plate 11. Edges of the cover plate 11 and the substrate 13 are sealed by a packaging glue 12. A space formed by attaching the cover plate 11 to the substrate 13 may not affect the rotation of the rotating mechanism.

In some embodiments, the display panel further includes a packaging layer 16 disposed on the substrate 13, for protecting the respective monochromatic electroluminescent components 17. It may be understood that the packaging layer 16 may be made of transmitting materials.

In one embodiment, a plurality of intermediate pillars 14 spaced apart from one another are disposed between the cover plate 11 and the substrate 13. An intermediate pillar 14 is provided between several pixel units 10 spaced apart from each other, in order to avoid deformation of the substrate 13 or the cover plate 11 caused by the external pressure to affect the rotation of the diaphragm set.

In one embodiment, the micro-electromechanical controller includes a miniature motor (not shown) that is connected to the bracket 19 to control the rotation of the bracket 19.

The present disclosure further provides a display device. The display device includes the display panel and the drive circuit provided in the embodiments of the present disclosure. The display panel includes a substrate 13 and several pixel units 10 formed on the substrate, the pixel unit 10 are arranged in an array. The pixel unit 10 includes:

a monochromatic electroluminescent component 17, which is disposed on the substrate 13;

a rotating mechanism, which includes a bracket 19 and a diaphragm set disposed on the bracket 19, the diaphragm set 15 includes diaphragms with at least two different colors;

a micro-electromechanical controller 18, which is connected to the bracket 19, to control rotation of the bracket 19, so as to control an orthographic projection of one diaphragm on the substrate 13 at least partially to be overlapped with an orthographic projection of the monochromatic electroluminescent component 17 on the substrate 13, such that light emitted by the monochromatic electroluminescent component 17 permeates through the diaphragms of different colors, and emits light corresponding to the colors of the diaphragms.

The drive circuit is used to drive each monochromatic electroluminescent component to emit light.

The present disclosure further provides a display method for a display panel provided by the embodiments of the present disclosure.

Figure 3:
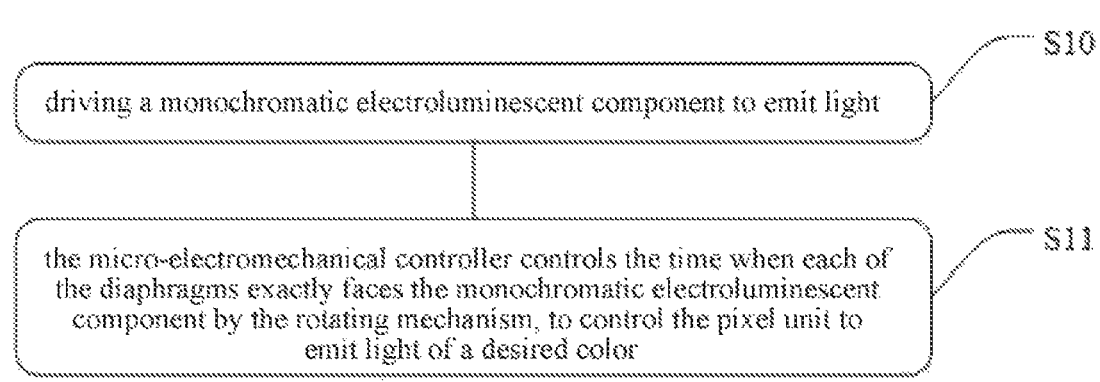
FIG. 3 shows an illustrative flowchart of a display method of the display panel according to an embodiment of the present disclosure.

Referring to FIG. 3, an illustrative flowchart of a display method for a display panel according to the embodiment of the present disclosure is shown. As shown in FIG. 3, the display method includes:

step S10: driving a monochromatic electroluminescent component to emit light;

step S11: the micro-electromechanical controller controls the time when each of the diaphragms exactly faces the monochromatic electroluminescent component by the rotating mechanism, to control the pixel unit to emit light of a desired color.

In step S11, the pixel unit of the display panel as shown in FIG. 1 may allow the pixel unit to emit light of various colors, by adjusting the time when each of the diaphragms exactly faces the monochromatic electroluminescent component, within a period invisible to the human eyes. The exactly facing as mentioned herein refers to that the orthographic projection of the diaphragm on the substrate may cover the orthographic projection of the electroluminescent component on the substrate or the positional relationship between the diaphragm and the electroluminescent component is overlap of the projections of the diaphragm and the electroluminescent component on the substrate. As shown in FIG. 2, the electroluminescent component 17 exactly faces the diaphragm 21 but not exactly faces the diaphragm 22 and the diaphragm 23.

In one embodiment, the pixel unit emits red light when the diaphragm rotated to the monochromatic electroluminescent component is a red diaphragm. As an example of the display panel in FIG. 2, the pixel unit emits red light when the bracket 19 controls the diaphragm set to rotate such that the diaphragm 21 exactly faces the monochromatic electroluminescent component 17.

In one embodiment, the pixel unit emits green light when the diaphragm rotated to the monochromatic electroluminescent component is a green diaphragm. As an example of the display panel in FIG. 2, the pixel unit emits green light when the bracket 19 controls the diaphragm set to rotate such that the diaphragm 22 exactly faces the monochromatic electroluminescent component 17.

In one embodiment, the pixel unit emits blue light when the diaphragm rotated to the monochromatic electroluminescent component is a transparent diaphragm. As an example of the display panel in FIG. 2, the pixel unit emits blue light when the bracket 19 controls the diaphragm set to rotate such that the diaphragm 23 exactly faces the monochromatic electroluminescent component 17.

It can be seen that the pixel unit of the RGB three-primary color may be achieved by means of the aforesaid diaphragms. The color of the pixel unit is adjusted by controlling the proportion occupied by the three-primary colors over a period of time when the color display is required. For example, the color is black when the proportions of the three-primary colors are identical to one another. The micro-electromechanical controller controls duration ratio of the three-primary colors by the rotating mechanism to control the respective pixel units to emit lights of different colors.

The flowchart and block diagram in the drawings show the system, the method according to the embodiments of the present disclosure, and an architecture, function and operation, which may achieve by a computer program product. In this regard, each block in the flowchart or block diagram may represent a module, a program segment, or a portion of code, which may include one or more executable commands for implementing the specified logic functions. It should be noted that in some implementations used for substitutions, the functions marked in the blocks may also occur in a sequence different from that marked in the drawings. For example, two successively represented blocks actually may be executed substantially in parallel, and they may sometimes be executed in a reverse sequence, depending upon the function involved. It is also noted that each block of the block diagrams and/or flowcharts, and combination of blocks in the block diagrams and/or flowcharts, may be implemented by using a dedicated hardware-based system that performs the specified function or operation, or may be implemented by a combination of dedicated hardware and computer instructions.

The foregoing description is only a preferred embodiment of the present disclosure and an explanation for principles of the employed technology. It should be understood by those skilled in the art that the scope involved in the present disclosure is not limited to the technical solutions combined by the above technical features, but also should cover other technical solutions formed by the aforesaid technical features or any combination of the equivalent technical features thereof without departing from the inventive concept, for example, the technical solution formed by mutual substitution of the above-described features for the technical features with similar function as disclosed but not limited to the present disclosure.

What is claimed is:

1. A display panel, comprising:
   a substrate;
   a plurality of pixel units formed on the substrate;
   wherein each of the pixel units comprises:
   a monochromatic electroluminescent component, disposed on the substrate;
   a rotating mechanism, comprising a bracket and a diaphragm set disposed on the bracket, the diaphragm set comprising diaphragms with at least two different colors;
   a micro-electromechanical controller, connected to the bracket to control rotation of the bracket, so as to control an orthographic projection of the diaphragm on the substrate to at least partially overlap with an orthographic projection of the monochromatic electroluminescent component on the substrate, such that a light emitted by the monochromatic electroluminescent component permeates through the diaphragms of different colors, and emits a light corresponding to the colors of the diaphragms.

2. The display panel according to claim 1, wherein the bracket is arranged perpendicular to the substrate.

3. The display panel according to claim 1, wherein the at least two diaphragms of different colors are uniformly disposed around the bracket that is taken as a center.

4. The display panel according to claim 3, wherein the diaphragms with at least two different colors are disposed on the same plane, the plane is parallel to the substrate, such that the bracket rotates to drive the diaphragm set to be movable within the plane parallel to the substrate.

5. The display panel according to claim 4, wherein an orthographic projection of the diaphragm on the substrate can cover an orthographic projection of the monochromatic electroluminescent component on the substrate.

6. The display panel according to claim 5, wherein the monochromatic electroluminescent component is a blue miniature electroluminescent component.

7. The display panel according to claim 6, wherein the diaphragm set comprises a red diaphragm, a green diaphragm, and a transparent diaphragm.

8. The display panel according to claim 7, wherein the diaphragm is circular, square, diamond, triangular, or fan-shaped.

9. The display panel according to claim 8, wherein the diaphragm is a fluorescent film.

10. The display panel according to claim 8, wherein the diaphragm is a quantum dot film.

11. The display panel according to claim 1, wherein the display panel further comprises a cover plate, and edges of the cover plate and the substrate are sealed by a packaging glue.

12. The display panel according to claim 11, wherein the display panel further comprises a packaging layer disposed on the substrate, for packaging the monochromatic electroluminescent components.

13. The display panel according to claim 12, wherein a plurality of intermediate pillars spaced apart from one another are disposed between the cover plate and the substrate.

14. The display panel according to claim 13, wherein the micro-electromechanical controller comprises a miniature motor.

15. The display panel according to claim 2, wherein the at least two diaphragms of different colors are uniformly disposed around the bracket that is taken as a center.

16. The display panel according to claim 15, wherein the at least two diaphragms of different colors are disposed on the same plane, the plane is parallel to the substrate, such that the bracket rotates to drive the diaphragm set to be movable within the plane parallel to the substrate.

17. The display panel according to claim 16, wherein an orthographic projection of the diaphragm on the substrate can cover an orthographic projection of the monochromatic electroluminescent component on the substrate.

18. The display panel according to claim 3, wherein the plane where the diaphragms are located has an angle in a range of 0° to 30° with the plane where the substrate is located.

19. A display device, comprising a display panel and a drive circuit,
the display panel comprising:
a substrate;
a plurality of pixel units formed on the substrate;
wherein each of the pixel units comprises:
a monochromatic electroluminescent component, disposed on the substrate;
a rotating mechanism, comprising a bracket and a diaphragm set disposed on the bracket, the diaphragm set comprises diaphragms with at least two different colors;
a micro-electromechanical controller, connected to the bracket, to control rotation of the bracket, so as to control an orthographic projection of one diaphragm on the substrate to at least partially overlap with an orthographic projection of the monochromatic electroluminescent component on the substrate, such that a light emitted by the monochromatic electroluminescent component permeates through the diaphragms of different colors, and emits a light corresponding to the colors of the diaphragms;
the drive circuit is electrically connected to the display panel, for driving the monochromatic electroluminescent components to emit light.

20. A display method used in a display panel, wherein the display panel comprises:
a substrate;
a plurality of pixel units formed on the substrate;
wherein each of the pixel units comprises:
a monochromatic electroluminescent component, disposed on the substrate;
a rotating mechanism, comprising a bracket and a diaphragm set disposed on the bracket, the diaphragm set comprises at least two diaphragms of different colors;
a micro-electromechanical controller, connected to the bracket, to control rotation of the bracket, so as to control an orthographic projection of one diaphragm on the substrate to at least partially overlap with an orthographic projection of the monochromatic electroluminescent component on the substrate, such that a light emitted by the monochromatic electroluminescent component permeates through the diaphragms of different colors, and emits a light corresponding to the colors of the diaphragms;
the display method comprises:
driving a monochromatic electroluminescent component to emit light;
controlling, by the micro-electromechanical controller, rotation of the rotating mechanism, to control a time when each of the diaphragms exactly faces to the monochromatic electroluminescent component, so as to control the pixel unit to emit light of a desired color.

* * * * *